(12) United States Patent
Alley

(10) Patent No.: US 7,407,194 B1
(45) Date of Patent: Aug. 5, 2008

(54) MUD FLAP SYSTEM

(76) Inventor: Steve Alley, 57292 190th St., Pacific Junction, IA (US) 51561

( * ) Notice: Subject to any disclaimer, the term of this patent is extended or adjusted under 35 U.S.C. 154(b) by 532 days.

(21) Appl. No.: 11/211,925

(22) Filed: Aug. 25, 2005

(51) Int. Cl.
B62B 9/14 (2006.01)

(52) U.S. Cl. ....................... 280/851; 280/154

(58) Field of Classification Search ............... 280/851, 280/847, 152.3, 848, 154, 155
See application file for complete search history.

(56) References Cited

U.S. PATENT DOCUMENTS

| | | | | |
|---|---|---|---|---|
| 2,605,119 A * | 7/1952 | Earnest | ...................... | 280/849 |
| 2,640,714 A * | 6/1953 | Garner et al. | ................ | 280/851 |
| 2,652,266 A * | 9/1953 | Miller | ........................ | 280/851 |
| 2,865,655 A * | 12/1958 | Boysen | ....................... | 280/851 |
| 2,935,336 A * | 5/1960 | Case | ........................... | 280/851 |
| 3,746,366 A * | 7/1973 | Bruce et al. | ................ | 280/851 |
| 3,848,842 A * | 11/1974 | Jepsen | ......................... | 248/560 |
| 3,877,722 A * | 4/1975 | Conner | ........................ | 280/154 |
| 4,033,599 A * | 7/1977 | Fusco | ........................ | 280/851 |
| 4,221,432 A * | 9/1980 | VanRemortel et al. | .... | 298/1 SG |
| 4,541,646 A * | 9/1985 | Knowley | ..................... | 280/851 |
| 5,121,944 A | 6/1992 | Haddox | ....................... | 280/848 |
| 5,181,734 A | 1/1993 | Brown | ....................... | 280/414.1 |
| 5,833,254 A * | 11/1998 | Bucho | ......................... | 280/154 |
| 6,076,842 A | 6/2000 | Knoer | ......................... | 280/154 |
| 6,179,311 B1 * | 1/2001 | Larkin et al. | ............... | 280/154 |
| 6,375,223 B1 | 4/2002 | Kirckof | ....................... | 280/851 |
| 6,460,892 B1 * | 10/2002 | Barr et al. | .................... | 280/847 |
| 6,485,059 B2 | 11/2002 | Burnstein | .................... | 280/851 |
| 6,604,724 B2 * | 8/2003 | Hawes et al. | ............... | 248/309.1 |
| 6,942,252 B2 * | 9/2005 | Buuck et al. | ................. | 280/847 |

* cited by examiner

*Primary Examiner*—Christopher Ellis
*Assistant Examiner*—Bridget Avery
(74) *Attorney, Agent, or Firm*—Holland & Hart LLP

(57) ABSTRACT

A mud flap system for vehicles is provided with first and second mounting arms that releasably engage side portions of a tow assembly. First and second support arms depend from the first and second mounting arms and support one or more mud flaps so that the mud flaps are positioned behind the rearward wheels of the vehicles and substantially across the space between the rearward wheels. A leash or brace are provided for structural stability and to secure the system with the tow assembly. A central mud flap may be provided in horizontal or vertical configurations according to the desired flow of matter beneath the vehicle.

17 Claims, 3 Drawing Sheets

MUD FLAP SYSTEM

BACKGROUND OF THE INVENTION

1. Field of the Invention

The present invention relates to mud flap systems used by vehicles and more particularly to a mud flap system that is releasably engageable with the opposite side portions of a vehicle tow assembly in a manner that disposes one or more mud flaps behind the vehicle's wheels and substantially across a length that extends between the opposite sides of the tow assembly in order to protect a trailer and its contents from road debris.

2. Description of the Prior Art

Many different motor vehicles are used to tow trailers of various types from one location to another. Often times, the trailers and their cargo incur damage due to rocks and other road debris that are projected upwardly and rearwardly by the vehicle as it travels down the road. The damage caused to the trailer and its cargo may vary from chipped paint to serious structural damage.

It is known in the automotive industry that mud flaps can be useful for deflecting rocks and road debris that are projected by a moving vehicle. However, most mud flaps that are installed on vehicles as original equipment may be too small to adequately deflect rocks and debris. Moreover, mud flaps are typically positioned immediately behind the wheel of a vehicle and neglect the open space between the rear wheels. Oftentimes rocks and other road debris will be projected upwardly in the direction of the vehicle's centerline, missing the side-mounted mud flaps entirely. Moreover, the positioning of typical mud flaps directly behind the rearward wheels will not typically deflect rocks or other debris that are projected at a low angle of trajectory. Such rocks and debris will typically pass just beneath the mud flaps and continue upwardly and rearwardly until they strike an object behind the vehicle, such as the trailer or its contents.

Prior art mud flap systems have recognized the desirability of moving the mud flaps closer to the rear bumper of a vehicle in order to increase the effectiveness of the mud flaps. The prior art has also recognized that it may be undesirable to permanently attach mud flaps to the rear bumper of a vehicle or any point adjacent thereto. Accordingly, mud flap systems, such as U.S. Pat. Nos. 5,121,944, 5,181,734, 6,076,842, and 6,375,223 were developed to be releasably engageable with the vehicle's tow assembly or a tongue frame member of the trailer being towed. However, each of these systems only places a pair of narrow mud flaps directly in line with the rear wheels of the vehicle. None of the prior art systems provide a manner of deflecting rocks and other road debris that travel upwardly from the ground along the vehicle's centerline. Moreover, each of these systems provide elongated support arms that extend outwardly from a central mounting point and support the mud flaps at their distal ends. This produces an undesirable weakness and lack of stability to the systems where the support arms are formed as a single cantilever arm from thin or lightweight materials. Air currents and other forces acting upon the mud flaps, as well as the accumulation of ice and other debris thereon, further pose the risk of undue movement of the system during use or structural fatigue along the support arms. Finally, the prior art systems fail to provide a manner of adjustably positioning the mud flaps with respect to one another, making such systems difficult for use with a wide range of vehicles that may have tow assemblies of different sizes and configurations.

Accordingly, what is needed is a novel mud flap system that is releasably attachable to the tow assembly of a vehicle in a manner that permits at least a portion of one or more mud flaps to be disposed along the center line of a vehicle, between its rearward wheels. Moreover, such a system should provide a relatively stable mounting system that resists fatigue and movement during use. Such a system should also provide a level of adjustability in the manner in which it is coupled to the tow assembly so that it may be used with a wide variety of vehicle types and configurations.

SUMMARY OF THE INVENTION

The mud flap system of the present invention is provided for use with a vehicle having a tow assembly comprising a tubular, transverse frame with opposing, open-end portions. The system is generally provided with first and second mounting arms, having engagement end portions that are shaped and sized to be operatively coupled with the opposite end portions of the transverse frame. In one embodiment, the engagement end portions are slidably received within the transverse frame. First and second support members depend from the first and second mounting arms in a generally parallel, spaced-apart manner. At least one mud flap is operatively coupled with the first and second support members so that, when the first and second mounting arms are coupled with the opposite end portions of the transverse frame, at least a portion of the one or more mud flaps is positioned adjacent the transverse frame, substantially across its length.

In a preferred embodiment, a securement means is provided for operatively coupling the first and second support members with one another in a manner that limits movement of the first and second support members with respect to one another. In one such embodiment, the securement means is comprised of an elongated, generally flexible leash that is coupled to opposite end portions of the system. In another embodiment, a brace is provided to releasably engage interior end portions of the first and second support members. In either embodiment, the securement means may provide lateral adjustability of the support members with respect to one another, which will permit adaptation of the system to tow assemblies of various sizes and configurations.

In one embodiment, the system is provided with a pair of mud flaps that depend from the first and second support members. In another embodiment, a single mud flap may extend along both the first and second support members. An optional third mud flap may also be provided to depend from the interior end portions of the first and second support members or from a brace that couples the first and second support member to one another. The third flap may also be positioned to extend from the first and second support members to a point along the trailer frame to position the third mud flap in a generally horizontal fashion. This arrangement will permit the passage of air and debris under the centerline of the vehicle while substantially preventing debris from striking the trailer of its cargo along their centerlines.

It is therefore a principle object of the present invention to provide a mud flap system that is releasably engageable with the tow assembly of a vehicle.

A further object of the present invention is to provide a mud flap system that disposes one or more mud flaps behind the rearward wheels of a vehicle and also behind the open area between the vehicles rearward wheels.

Still another object of the present invention is to provide an accessory mud flap system that is adjustably mounted to the tow assembly of a vehicle so that the system may be used with a wide range of different vehicles of various sizes and configurations.

Yet another object of the present invention is to provide a mud flap system for a vehicle that utilizes vertically and horizontally oriented mud flaps to deflect rearwardly projected debris without restricting air flow passing beneath the vehicle's center line.

A further object of the present invention is to provide an accessory mud flap system that provides an increased relative structural stability over prior art systems.

Yet another object of the present invention is to provide an accessory mud flap system that may be quickly and easily coupled with the tow assembly of a vehicle.

A further object of the present invention is to provide an accessory mud flap system that is relatively simple and inexpensive in construction.

These and other objects of the present invention will be apparent to those having skill in the art.

DESCRIPTION OF THE PREFERRED EMBODIMENT

Figure 1:
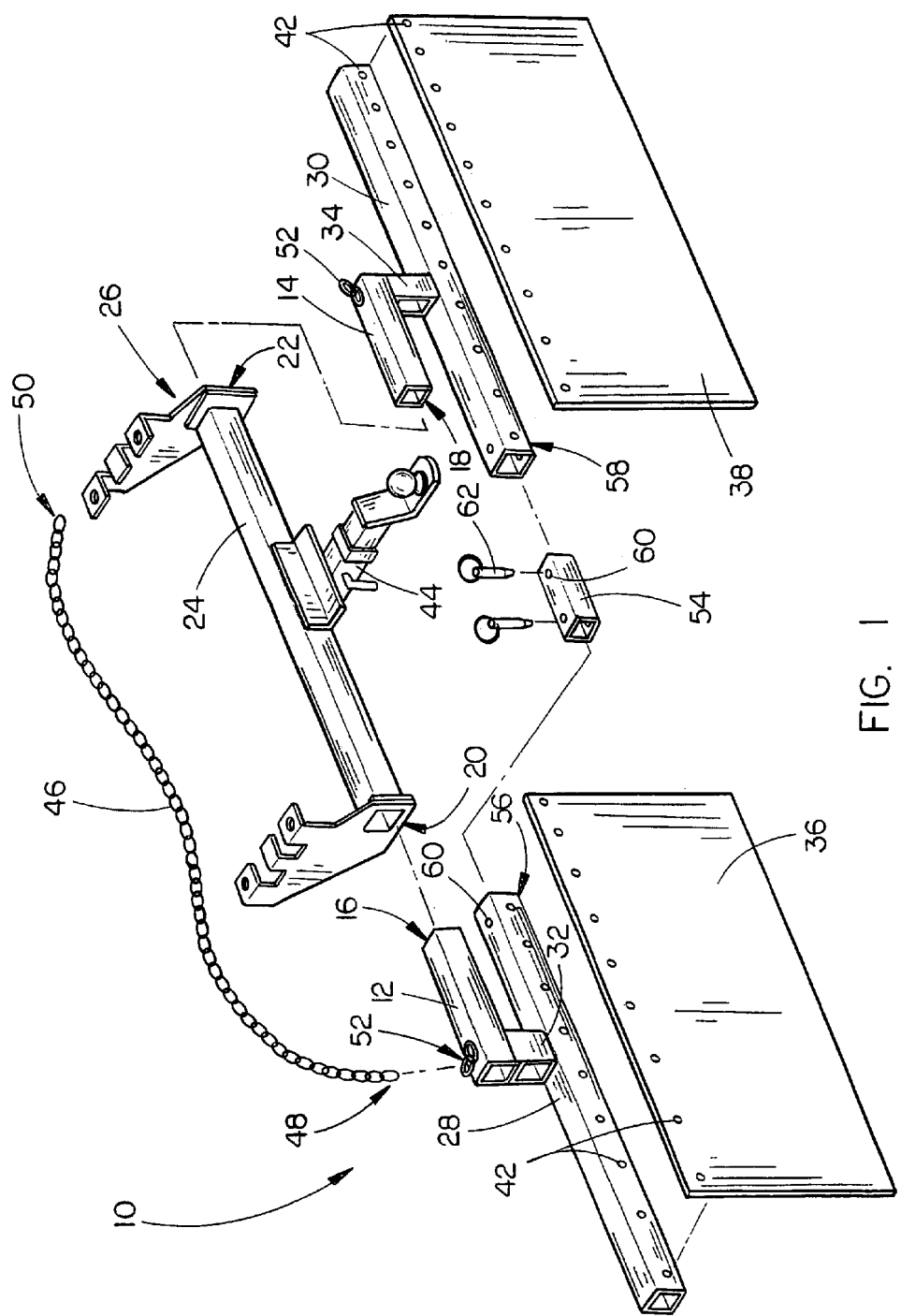
FIG. 1 is an isometric, partially exploded view of one preferred embodiment of the mud flap system of the present invention.

In the following detailed description of exemplary embodiments, reference is made to accompanying FIGS. 1-3, which form a part hereof and show by way of illustration exemplary embodiments of the present invention. These embodiments are disclosed in sufficient detail to enable those skilled in the art to practice the invention. It is to be understood that other embodiments may be utilized, however, and other changes may be made, without departing from the spirit or scope of the present invention. The following detailed description is, therefore, not to be taken in a limiting sense, and the scope of the present invention is defined only by the appended claims.

In a preferred embodiment, the mud flap system 10 is generally provided with a first mounting arm 12 and a second mounting arm 14. The first and second mounting arms 12 and 14 are provided with engagement end portions 16 and 18, which are shaped and sized to be coupled with the opposite end portions 20 and 22 of a transverse frame member 24 to a vehicle tow assembly 26. In a preferred embodiment, the engagement end portions 16 and 18 may be received within openings formed in the opposite end portions 20 and 22 of the transverse frame 24. It is contemplated, however, that where no openings are provided in the opposite end portions 20 and 22 of the transverse frame 24, the engagement end portions 16 and 18 of the first and second mounting arms 12 and 14 may be simply coupled with the transverse frame 24 using bolts or other known fasteners.

The system 10 is further provided with a first support member 28 and a second support member 30, which depend from the first and second mounting arms 12 and 14, respectively. In a preferred embodiment, the first and second support members 28 and 30 are positioned to be in a generally parallel, spaced-apart manner with the first and second mounting arms 12 and 14. First and second spacer arms 32 and 34 may be provided to operatively couple the first and second mounting arms 12 and 14 with the first and second support numbers 28 and 30, in a manner that provides the optimum orientation with respect to one another.

At least a first mud flap 36 should be operatively coupled with the first and second support members 28 and 30 so that, when the first and second mounting arms 12 and 14 are coupled with the opposite ends 20 and 22 of the transverse frame 24, at least a portion of the first mud flap 36 is positioned adjacent the transverse frame 24, substantially across a length that extends between the opposite ends 20 and 22 of the transverse frame 24. It is contemplated, however, that a plurality of mud flaps could be used with the mud flap system 10. For example, FIG. 1 depicts the additional use of a second mud flap 38, while FIGS. 2 and 3 show alternate embodiments that incorporate the use of a third mud flap 40. Irrespective of the number of mud flaps used with the system 10, it is contemplated that the mud flaps will be provided in a generally flexible form and may be comprised of nearly any material, including various plastics, rubbers, and various synthetic derivations thereof. Regardless of the manner in which they are formed, the mud flaps may be operatively coupled with the first and second support members 28 and 30 using a plurality of fasteners 42, which might include known fasteners such as snaps, or apertures within the mud flaps and in the support members that are shaped and sized to receive bolts, screws, and the like.

Figure 2:
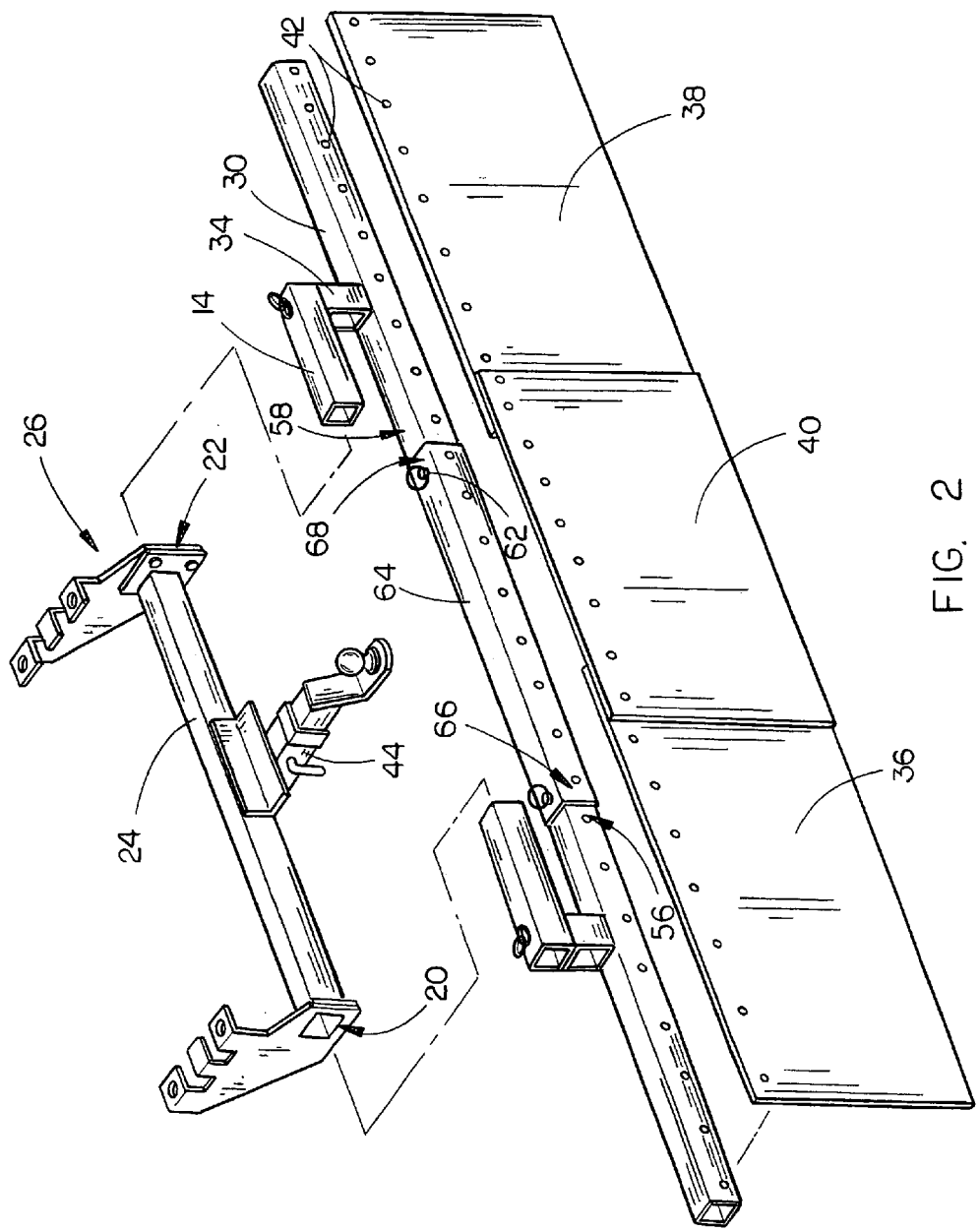
FIG. 2 is an isometric, partially assembled view of another preferred embodiment of the mud flap system of the present invention.
Figure 3:
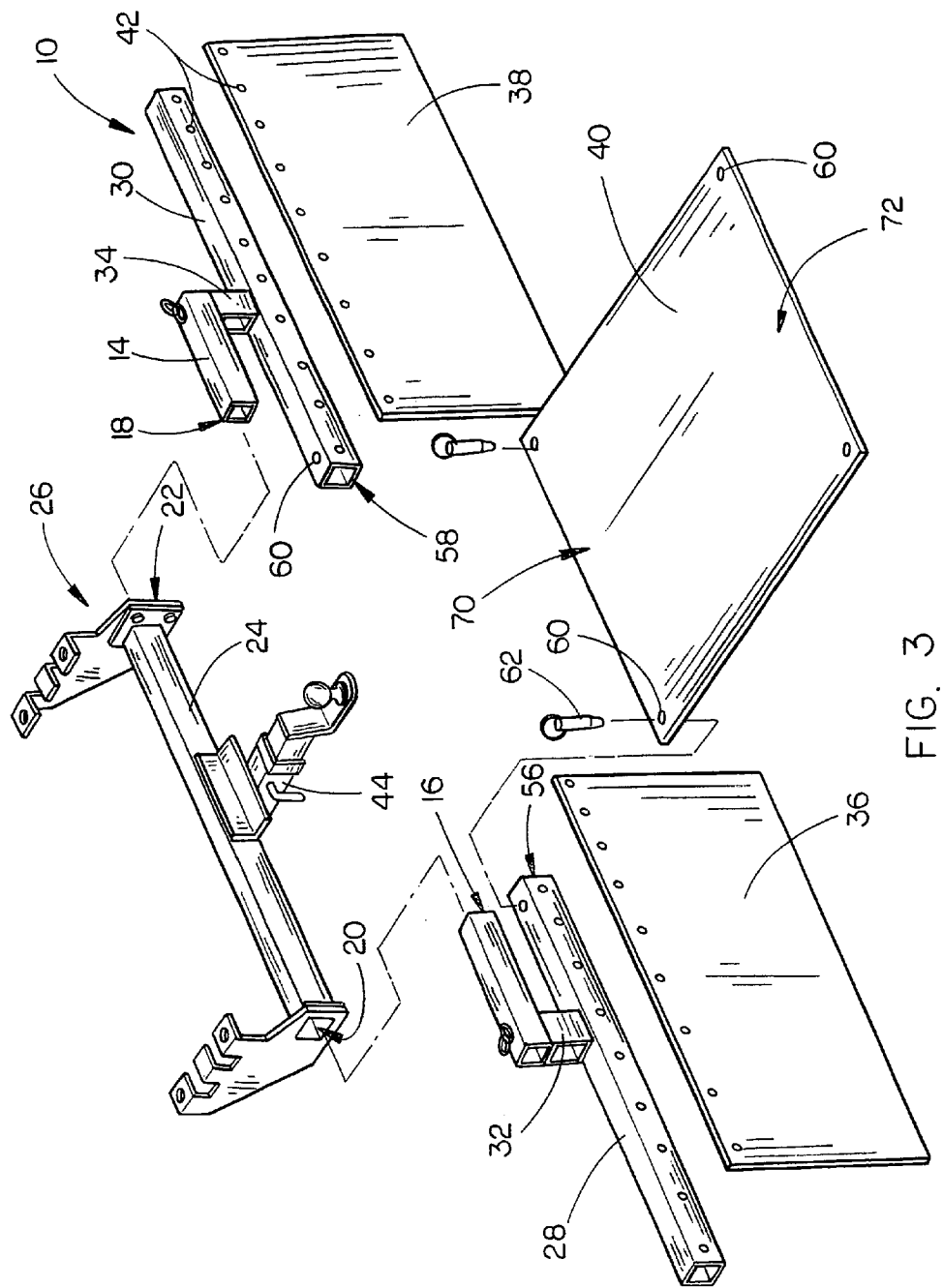
FIG. 3 is an isometric, partially exploded view of still another preferred embodiment of the mud flap system of the present invention.

FIGS. 1-3 demonstrate one preferred method of coupling the system 10 with the vehicle tow assembly 26, wherein the first and second support members 28 and 30 are hung generally parallel to, but beneath, the transverse frame 24. It is contemplated, however, that the configuration of the vehicle tow assembly may require that first and second mounting arms 12 and 14 be coupled with the transverse frame 24 in a manner that positions the first and second support members behind the transverse frame 24 and above the receiver 44. This may be accomplished by simply rotating the individual assemblies by ninety degrees prior to coupling the first and second mounting arms 12 and 14 with the transverse frame 24. Where such positioning is desired, fasteners 42 will need to be positioned on an adjacent face of the first and second support members 28 and 30 to operatively receive the mud flaps. In one preferred embodiment, fasteners 42 may be provided on two adjacent faces of each of the first and second support members 28 and 30 to provide a user with alternate mounting positions for the mud flap system 10.

Irrespective of the mounting positions of the first and second support members 28 and 30 with respect to the transverse frame 24, it may be desirable to use a securement means for operatively coupling the first and second support members 28 and 30 with one another in a manner that limits movement of the first and second support members 28 and 30 with respect to one another. It should be apparent that, once the system 10 is coupled with the vehicle to assembly 26, arresting relative movement between the first and second support members 28 and 30 will lock the system 10 in position and substantially prevent unwanted removal of the system 10 from the vehicle tow assembly 26. In one embodiment, the securement means may be provided in the form of an elongated, generally flexible leash 46, having opposite end portions 48 and 50 that may be removably coupled with anchor members 52 that extend from a portion of the first and second mounting arms 12 and 14 or the first and second support members 28 and 30. The length of the leash 46 should be provided so that, when the leash 46 is secured to the mud flap system 10, relative movement of the first and second support members 28 and 30 with respect to one another is limited. Various materials, such as linked chains, braided cable, and the like may be used to form the leash 46.

In another preferred embodiment, the securement means may be provided in the form of a brace 54, having opposite end portions. In one embodiment, interior end portions 56 and 58 of the first and second support members 28 and 30 are provided with openings that are in communication with interior cavities formed within the first and second support members 28 and 30. The opposite end portions of the brace 54 are sized and shaped to be selectively positioned through the openings of the interior end portions 56 and 58, into the interior cavities of the first and second support members 28 and 30. In order to secure the brace 54 with respect to the first and second support members 28 and 30, a plurality of openings 60 may be formed through the interior end portions 56 and 58 of the first and second support members 28 and 30 as well as the brace 54. Locking pins 62 may be passed through the openings 60 to releasably secure the structures to one another. Providing a plurality of openings 60 along a length of the interior end portions 56 and 58 and/or the brace 54 will provide the system 10 with a degree of lateral adjustability that allows the brace 54 to be pinned in position along various lengths of the respective first and second support members 28 and 30.

In another embodiment, a brace 64 may be provided with opposite open end portions 66 and 68, which are sized and shaped to slideably receive portions of the interior end portions 56 and 58 of the first and second support members 28 and 30 therein. Again, a plurality of openings 60 and locking pins 62 may be provided to secure the structures with respect to one another and a plurality of openings 60 along the lengths of either or both of the brace 64 or the first and second support members 28 and 30 will provide a degree of lateral adjustability with respect to the positioning of the structures with respect to one another. This may permit the lengthening or narrowing of the system 10 when it is to be used with wide or narrow vehicle tow assemblies 26. Where such an arrangement is provided, the mud flaps may be individually securable to the first and second support members 28 and 30 as well as the brace 64. However, it is contemplated that the mud flaps may be simultaneously coupled with one or both of the first or second support members 28 and 30 and the brace 64. Where a central or third mud flap 40 is used, it is contemplated that an opening may be formed in the upper end portion thereof to allow the passage of the receiver 44 therethrough, where the system 10 is coupled with the vehicle tow assembly 26 in a manner that disposes the first and second support members 28 and 30 and the brace 64 above the receiver 44.

In another embodiment, depicted in FIG. 3, an upper end portion 70 of the third mud flap 40 may be operatively coupled with the interior end portions 56 and 58 of the first and second support members 28 and 30 or the brace 64. A plurality of openings 60 and locking pins 62 may be used separately from, or in conjunction with the previously described fasteners 42. A lower end portion 72 of the third mud flap 40 may be removably coupled with a structure related to a trailer that is coupled with the vehicle tow assembly 26. Fasteners 42, opening 60 and locking pins 62, or an attachment bracket (not shown) may be used to operatively couple the lower end portions 72 with the trailer. Regardless of its manner of attachment, a preferred positioning of the third mud flap 40 will dispose it in a generally horizontal position so that air and debris flowing under the vehicle may freely pass between the first mud flap 36 and second mud flap 38 and beneath the horizontally disposed third mud flap 40. In this manner, rocks and road debris may be prevented from striking the trailer or any articles thereon, without restricting the air current that passes beneath the vehicle when it is in motion.

In the drawings and in the specification, there have been set forth preferred embodiments of the invention; and although specific items are employed, these are used in a generic and descriptive sense only and not for purposes of limitation. Changes in the form and proportion of parts, as well as substitution of equivalents, are contemplated as circumstances may suggest or render expedient without departing from the spirit or scope of the invention as further defined in the following claims.

Thus it can be seen that the invention accomplishes at least all of its stated objectives.

I claim:

1. A mud flap system for use with a vehicle having a tow assembly with a tubular, transverse frame with opposing open end portions and a receiver, the system comprising:
   first and second mounting arms, having engagement end portions that are shaped and sized to be operatively coupled with the opposing end portions of the transverse frame;
   first and second support members, depending from said first and second mounting arms in a generally parallel, spaced-apart manner; and
   at least one mud flap operatively coupled with said first and second support members so that, when said first and second mounting arms are operatively coupled with the opposing end portions of the transverse frame, at least one mud flap is positioned adjacent the transverse frame, substantially across a length that extends between the opposing end portions of the transverse frame.

2. The system of claim 1 wherein said first and second support members are formed as separate structural members.

3. The system of claim 1 further comprising first and second spacing arms disposed between the first mounting arm and first support member and second mounting arm and second support member, respectively, to position said first and second mounting arms in a spaced-apart relationship with said first and second support members.

4. The system of claim 1 wherein said first and second mounting arms are sized and shaped to be at least partially slidably received within the opposing open end portions of the tow assembly.

5. The system of claim 2 further comprising securement means for operatively coupling said first and second support members with one another in a manner that limits movement of said first and second support members with respect to one another.

6. The system of claim 5 wherein said securement means further assists in preventing said first and second mounting arms from becoming unintentionally uncoupled with the opposite end portions of the transverse frame.

7. The system of claim 5 wherein said securement means is comprised of an elongated, generally flexible leash having opposite end portions.

8. The system of claim 5 wherein said securement means is comprised of a brace that operatively and releasably couples interior end portions of said first and second support members with one another.

9. The system of claim 8 wherein said interior end portions of said first and second support members are provided with openings, which are in communication with interior cavities within said first and second support members, and said brace is provided with opposite end portions that are sized and shaped to be selectively positioned through said openings into said interior cavities.

10. The system of claim 8 wherein said brace is provided with open opposite end portions that are in communication with an interior cavity and the interior end portions of said first and second support members are sized and shaped to be selectively positioned through said openings into said interior cavity.

11. The system of claim 8 wherein the interior end portions of said first and second support members and opposite end portions of said brace are selectively engageable with one another in a manner that permits said first and second support members to be secured in a static position with respect to one another at variable distances apart from one another so that the system may be adjusted for use with various tow assemblies having transverse frames of various lengths.

12. The system of claim 9 further comprising a plurality of lock pins that are selectively disposed at least partially through said first and second support members and the opposite end portions of said brace so that said first and second support members are secured in position with respect to one another.

13. The system of claim 10 further comprising a plurality of lock pins that are selectively disposed at least partially through said first and second support members and the opposite end portions of said brace so that said first and second support members are secured in position with respect to one another.

14. The system of claim 10 wherein at least one mud flap is provided as a first mud flap operatively coupled with said first support member, a second mud flap operatively coupled with said second support member and a third mud flap operatively coupled with said brace.

15. The system of claim 14 wherein said third mud flap has opposite side edge portions that are positioned closely adjacent interior edge portions of said first and second mud flaps when said first and second mounting arms are coupled with the opposite end portions of the transverse frame.

16. The system of claim 14 wherein said third mud flap is coupled with said brace along an upper edge portion of said third mud flap and a lower edge portion of said third mud flap is removably coupled with a portion of a trailer that is coupled with the tow assembly so that said third mud flap is generally horizontally disposed.

17. The system of claim 16 wherein said first and second mud flaps are generally horizontally disposed, behind rear wheels of the vehicle, so that air and debris flowing under the vehicle may freely pass between said first and second mud flaps and beneath said horizontally disposed third mud flap.

* * * * *